(12) United States Patent
Nishikawa (10) Patent No.: US 8,352,170 B2
(45) Date of Patent: Jan. 8, 2013

(54) TRAVELING APPARATUS AND METHOD OF CONTROLLING PARALLEL TWO-WHEELED VEHICLE

(75) Inventor: Gousuke Nishikawa, Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1085 days.

(21) Appl. No.: 11/803,508

(22) Filed: May 15, 2007

(65) Prior Publication Data
US 2008/0082252 A1 Apr. 3, 2008

(30) Foreign Application Priority Data

Jun. 12, 2006 (JP) ................................ 2006-162793

(51) Int. Cl.
*G06F 17/00* (2006.01)

(52) U.S. Cl. ........ 701/124; 701/109; 701/123; 180/167; 180/65.1; 180/65.25; 180/65.8; 180/65.245; 180/271; 180/272; 180/282; 180/285; 340/427; 340/428; 340/439; 340/441; 340/429

(58) Field of Classification Search .................. 701/124, 701/33, 29, 123, 109; 180/171, 271, 285, 180/167, 65.1; 340/439, 427, 428, 441
See application file for complete search history.

(56) References Cited

U.S. PATENT DOCUMENTS

| 3,971,091 A | * | 7/1976 | Peren et al. ..................... 15/49.1 |
| 5,971,091 A | | 10/1999 | Kamen et al. |
| 2003/0205419 A1 | * | 11/2003 | Kamen et al. ................... 180/21 |
| 2005/0121866 A1 | * | 6/2005 | Kamen et al. .............. 280/47.18 |

FOREIGN PATENT DOCUMENTS

| JP | 2004-243845 | 9/2004 |
| JP | 2005-6435 | 1/2005 |
| JP | 2005-94898 | 4/2005 |

OTHER PUBLICATIONS

U.S. Appl. No. 12/503,204, filed Jul. 15, 2009, Nishikawa.
U.S. Appl. No. 12/790,341, filed May 28, 2010, Kosaka.

* cited by examiner

*Primary Examiner* — Redhwan K Mawari
(74) *Attorney, Agent, or Firm* — Oblon, Spivak, McClelland, Maier & Neustadt, L.L.P.

(57) ABSTRACT

A traveling apparatus is provided. The traveling apparatus includes: a driver configured to independently drive two wheels disposed in parallel; a chassis configured to connect the two wheels; a detector provided in the chassis configured to detect a posture angle of the chassis, rotating speed of the two wheels being set respectively based on information on the detected posture angle; and an empty vehicle controller configured to control a posture of a vehicle to stand the vehicle independently in a state of no rider on board. The empty vehicle controller limits or controls the posture angle at the start of the posture control of the vehicle.

12 Claims, 8 Drawing Sheets

TRAVELING APPARATUS AND METHOD OF CONTROLLING PARALLEL TWO-WHEELED VEHICLE

CROSS REFERENCES TO RELATED APPLICATIONS

The present invention contains subject matter related to Japanese Patent Application JP 2006-162793 filed in the Japanese Patent Office on Jun. 12, 2006, the entire contents of which being incorporated herein by reference.

BACKGROUND OF THE INVENTION

1. Field of the Invention

The present invention relates to a traveling apparatus that is suitable for use in the case where posture control is performed on a parallel two-wheeled vehicle to stand the vehicle independently and a method of controlling the parallel two-wheeled vehicle. Specifically, in the case where the vehicle is in an empty state and in a transition state between the empty state and a riding state, an unnecessary behavior of the vehicle can be prevented so that a rider easily gets on and drops off the vehicle.

2. Description of the Related Art

U.S. Pat. No. 5,971,091, for example, discloses a parallel two-wheeled vehicle of related art, in which posture control of the vehicle is performed by detecting an inclination of the vehicle using a plurality of gyroscopes.

In addition, Japanese Unexamined Patent Application Publication No. 2005-006435 discloses a vehicle in which both posture control and travel control are stably performed against a load weight change.

However, in the above-described patent references, there is no description about the technology to stably operate the vehicle when the vehicle is in the empty state and in the transition state between the empty state and the riding state.

SUMMARY OF THE INVENTION

A parallel two-wheeled vehicle such as those disclosed in the above-described patent references has been known in the past as the vehicle traveling by two wheels with a man getting on board, for example. However, since the posture is controlled by driving the wheels in response to a movement of a vehicle body in such parallel two-wheeled vehicle, the wheels may be driven by a slight movement of the vehicle body after the posture control is started and the vehicle may not stand still at the same place in the empty state of no rider on board, for example. Accordingly, in the case of the parallel two-wheeled vehicle of the related art, it has been necessary to support the vehicle such that someone always puts a hand, thereby preventing the vehicle from moving after the rider drops off the vehicle.

On the other hand, an empty mode in which the posture control is performed in the empty state of no rider on board and a riding mode in which the posture control is performed in the riding state of the rider on board are so defined that the control of the parallel two-wheeled vehicle to independently stand the vehicle is appropriately performed in respective modes. However, even if such empty mode and riding mode are defined, the vehicle receives discontinuous control commands unless parameters are operated continuously during the transition from one mode to the other mode, and therefore there is such a possibility that a movement of the vehicle becomes unstable and causes an unnecessary behavior to the vehicle.

Furthermore, in the case where the posture control is started in a state of the vehicle being at an unsuitable posture angle, also there is such possibility that the movement becomes unstable and causes the unnecessary behavior to the vehicle since the vehicle similarly receives the discontinuous control commands. Accordingly, a specific skill is required in order for the rider to get on and drop off the parallel two-wheeled vehicle of the related art without assistance, since the movement of the vehicle typically becomes unstable as described above and it is particularly difficult to get on and drop off the vehicle. Therefore, it has been difficult in general to use the parallel two-wheeled vehicle of the related art.

It is desirable to provide a traveling apparatus in which a vehicle may not receive discontinuous control commands from a sensor and the like particularly during the transition between the empty mode and the riding mode; the movement may not become unstable and may not cause unnecessary behavior to the vehicle; and therefore it is not difficult for a user in general to use the apparatus.

Therefore, a traveling apparatus according to an embodiment of the present invention includes: a driver configured to independently drive two wheels disposed in parallel; a chassis configured to connect the two wheels; and a detector provided to the chassis configured to detect a posture angle of the chassis, rotating speed of the two wheels being set respectively based on information on the detected posture angle. The traveling apparatus is configured such that an activation of a specific function can be arbitrarily controlled when the vehicle is in the empty state and in the transition state between the empty state and the riding state, thereby preventing unnecessary behavior of the vehicle so that particularly the rider can get on and drop off the vehicle easily.

According to an embodiment of the present invention, a traveling apparatus includes an empty vehicle controller configured to control the posture of a vehicle to stand the vehicle independently in a state of no rider on board, and the empty vehicle controller limits or controls a posture angle at the start of the posture control of the vehicle so that the unnecessary behavior of the vehicle can be prevented from occurring in the empty state.

According to an embodiment of the present invention, the empty vehicle controller controls a position of the vehicle to be maintained regardless of the information on the detected posture angle so that the unnecessary behavior of the vehicle can be prevented from occurring in the empty state.

According to an embodiment of the present invention, a traveling apparatus includes the empty vehicle controller configured to control the posture of the vehicle to stand the vehicle independently in the state of no rider on board, a riding controller configured to control the posture of the vehicle to stand the vehicle independently in a state of the rider on board, and a riding detector provided to the riding controller to detect a state of the rider having completed boarding. In the traveling apparatus, a function of turning the vehicle is stopped in a transition from the control by the empty vehicle controller to the control by the riding controller until the riding detector detects the rider having completed the boarding so that the rider can easily get on the vehicle.

According to an embodiment of the present invention, the empty vehicle controller controls the position of the vehicle to be maintained regardless of the information on the detected posture angle, and the riding controller cancels the control to maintain the position of the vehicle after the transition so that the unnecessary behavior of the vehicle can be prevented from occurring in the empty state.

According to an embodiment of the present invention, a traveling apparatus includes the empty vehicle controller configured to control the posture of the vehicle to stand the vehicle independently in the state of no rider on board, the riding controller configured to control the posture of the vehicle to stand the vehicle independently in the state of the rider on board, the riding detector provided to the riding controller to detect the state of the rider having completed boarding. In the traveling apparatus, a function of turning the vehicle is stopped in a transition from the control by the riding controller to the control by the empty vehicle controller so that the rider can easily drop off the vehicle.

According to an embodiment of the present invention, the empty vehicle controller controls the position of the vehicle to be maintained regardless of the information on the detected posture angle after the transition to the control of the empty vehicle controller so that the unnecessary behavior of the vehicle can be prevented from occurring in the empty state.

According to an embodiment of the present invention, a posture of the vehicle is controlled by detecting the posture angle, and the posture angle is limited or controlled at the start of the posture control of the vehicle in the empty state so that the unnecessary behavior of the vehicle can be prevented from occurring in the empty state.

According to an embodiment of the present invention, the position of the vehicle is controlled to be maintained in the empty state regardless of the information on the posture angle so that the unnecessary behavior of the vehicle can be prevented from occurring in the empty state.

According to an embodiment of the present invention, the posture of the vehicle is controlled by detecting the posture angel, and the function of turning the vehicle is stopped until detecting the rider having completed boarding in the transition from the empty state to the riding state so that the rider can easily get on the vehicle.

According to an embodiment of the present invention, the posture angle at the start of the posture control of the vehicle is limited or controlled in the empty state and the position of the vehicle is controlled to be maintained regardless of the information on the posture angle, and the control to maintain the position of the vehicle is cancelled after the transition to the riding state so that the unnecessary behavior of the vehicle can be prevented from occurring in the empty state.

According to an embodiment of the present invention, the posture of the vehicle is controlled by detecting the posture angle, and the function of turning the vehicle is stopped in the transition from the riding state to the empty state so that the rider can easily drops off the vehicle.

According to an embodiment of the present invention, the position of the vehicle is controlled to be maintained regardless of the information on the posture angle after the transition to the empty state so that the unnecessary behavior of the vehicle can be prevented from occurring in the empty state.

Accordingly, in apparatuses of the related art, the vehicle may receive discontinuous control commands from a sensor and the like particularly during the transition between the empty mode and the riding mode; the movement may become unstable and may cause unnecessary behavior to the vehicle; and therefore it is difficult for a user in general to use the apparatus. However, according to the embodiments of the present invention the apparatus without such problems can be obtained.

DESCRIPTION OF THE PREFERRED EMBODIMENTS

Hereinafter, preferred embodiments of the present invention are explained by referring to the accompanied drawings.

Figure 1A:
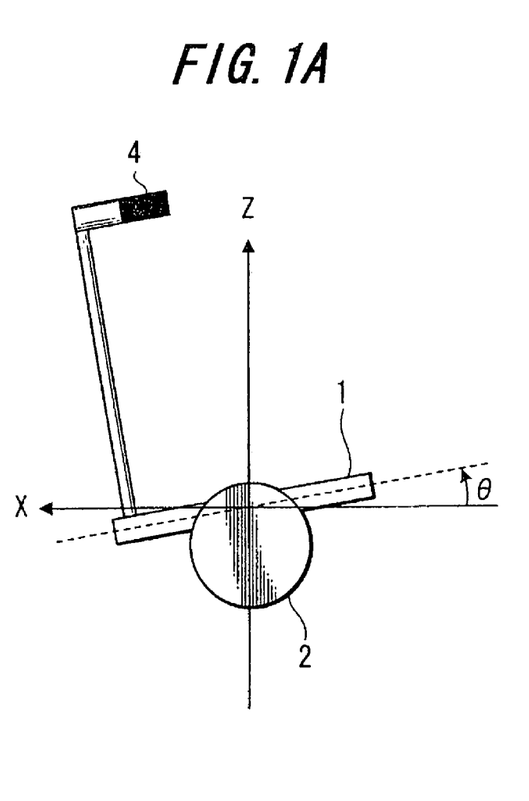
FIGS. 1A and 1B are schematic diagrams of a parallel two-wheeled vehicle to which an embodiment of the present invention is applied.
Figure 1B:
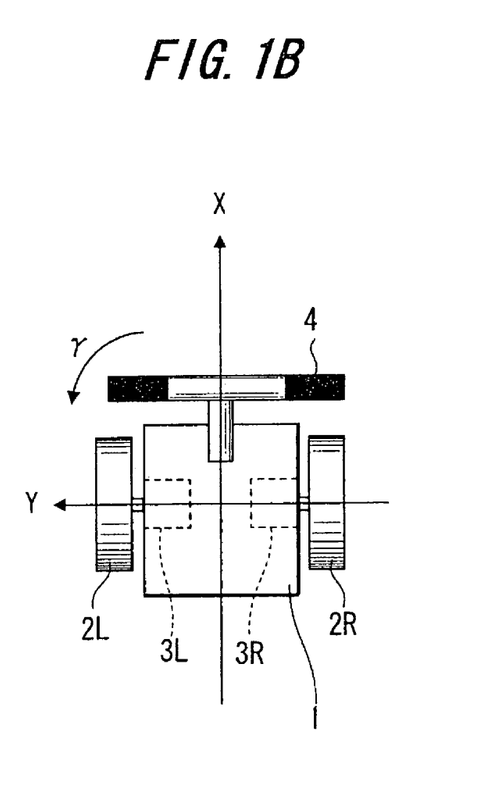

First, a configuration of a parallel two-wheeled vehicle, to which an embodiment of the present invention is applied, is shown in FIGS. 1A and 1B. Specifically, the parallel two-wheeled vehicle includes, as shown in FIGS. 1A and 1B, wheels 2L and 2R on the same axis line in parallel to a step 1 for a rider to ride, and further includes drive units 3L and 3R that can generate driving power independently for the respective wheels 2L and 2R. In addition, the step 1 includes a sensor or switch (not shown) incorporated to identify whether the rider gets on board, and a handle 4 erected from the step 1 for the rider to hold and operate the vehicle.

Further, as described in FIGS. 1A and 1B, respective coordinate systems for the whole parallel two-wheeled vehicle used in the explanation below are set such that an X-axis is a vertical direction to a wheel axle, a Y-axis is a direction of the wheel axle, a Z-axis is a vertical direction to the ground, a pitch axis ($\theta$) is a direction around the wheel axle, and a yaw axis ($\gamma$) or turn axis is a turning direction on the X-Y plane viewing from a top of the vehicle.

Figure 2:
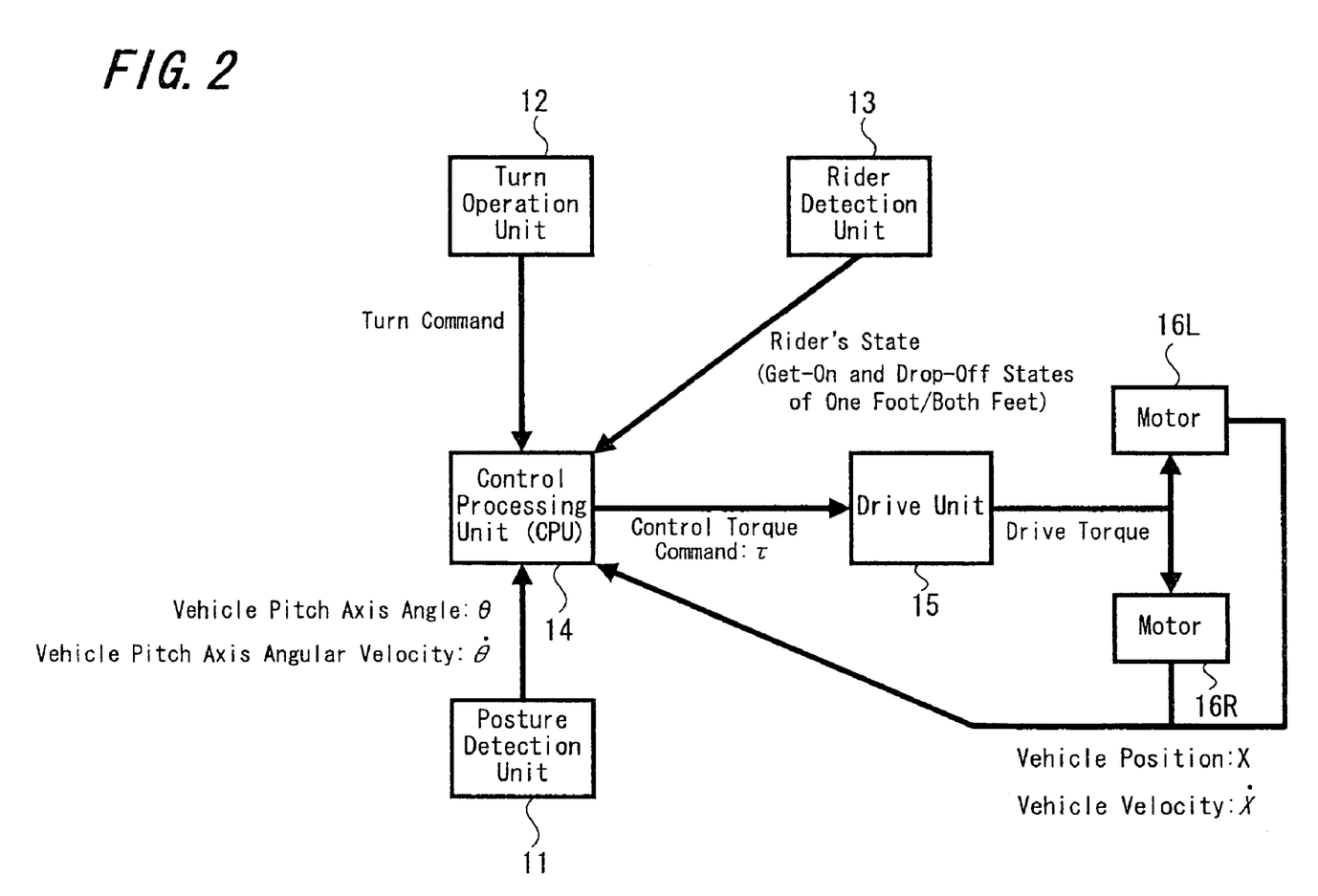
FIG. 2 is a block diagram showing a drive system of the parallel two-wheeled vehicle to which an embodiment of the present invention is applied.

As shown in FIG. 2, the drive system in such parallel two-wheeled vehicle includes: a posture detection unit 11 configured to detect an inclination of the vehicle using a gyroscopic sensor, an acceleration sensor and the like; a turn operation unit 12 configured to input a turn command using a control lever associated with the handle 4; and a rider detection unit 13 using a load sensor, a proximity sensor, a contact switch and the like to detect the behavior of the rider (such as get-on and drop-off of a foot). Further, the drive system includes a control processing unit (CPU) 14 for calculating a torque command to drive the vehicle based on information received from the above-described units 11 through 13.

Further, the control torque command calculated in the control processing unit 14 is transmitted to a drive unit 15, and drive torque prepared in the drive unit 15 is supplied to motors 16L and 16R that are provided respectively and independently to the above-described wheels 2L and 2R. In addition, information based on the rotation of the motors 16L and 16R is fed back to the control processing unit 14. The parallel two-wheeled vehicle is controlled with such configuration of the drive system.

In order to control the movement of the vehicle, necessary torque is each obtained by the following operations. The torque for pitch axis control of controlling the posture of the vehicle is obtained with [Formula 1]; the torque for X-axis control of controlling the position of the vehicle is obtained with [Formula 2]; and the torque for yaw axis control of controlling the turn of the vehicle is obtained with [Formula 3]. An output torque to be supplied to the drive unit as a sum of the above is obtained with [Formula 4]. It should be noted that Kpp, Kdp, Kip, Kpx, Kdx, Kix, Kpy, Kdy, and Kiy represent control gain parameters in the following formulas.

Pitch Axis Control $$\tau p = -Kpp \times (\theta ref - \theta) - Kdp \times (\dot{\theta}ref - \dot{\theta}) - Kip \times \int (\theta ref - \theta) dt \quad \text{[Formula 1]}$$

where θref is a target pitch axis angle and $\dot{\theta}$ref is a target pitch axis angular velocity.

X-Axis Position Control $$\tau x = -Kpx \times (Xref - X) - Kdx \times (\dot{X}ref - \dot{X}) - Kix \times \int (Xref - X) dt \quad \text{[Formula 2]}$$

where Xref is a target vehicle position and $\dot{X}$ref is a target vehicle velocity.

Yaw Axis Turn Control $$\tau y = Kpy \times (\gamma ref - \gamma) + Kdy \times (\dot{\gamma}ref - \dot{\gamma}) + Kiy \times \int (\gamma ref - \gamma) dt \quad \text{[Formula 3]}$$

where γref is a target yaw axis angle and $\dot{\gamma}$ref is a target yaw axis angular velocity.

Output Torque (One Axis)

$$\tau = \tau p + \tau x + \tau y \quad \text{[Formula 4]}$$

More specifically, in order to perform the desired control, the control processing unit 14 calculates the necessary output torque τ to each of the wheels 2L and 2R using those [Formula 1] through [Formula 4]. The calculated control torque command is transmitted to the drive unit 15, and the drive torque prepared in the drive unit 15 is supplied to the motors 16L and 16R. Accordingly, the wheels 2L and 2R are respectively driven to obtain a desired movement, and the desired movement such as the travel and turn in a desired direction, increase and decrease in traveling velocity can be obtained.

Figure 3:
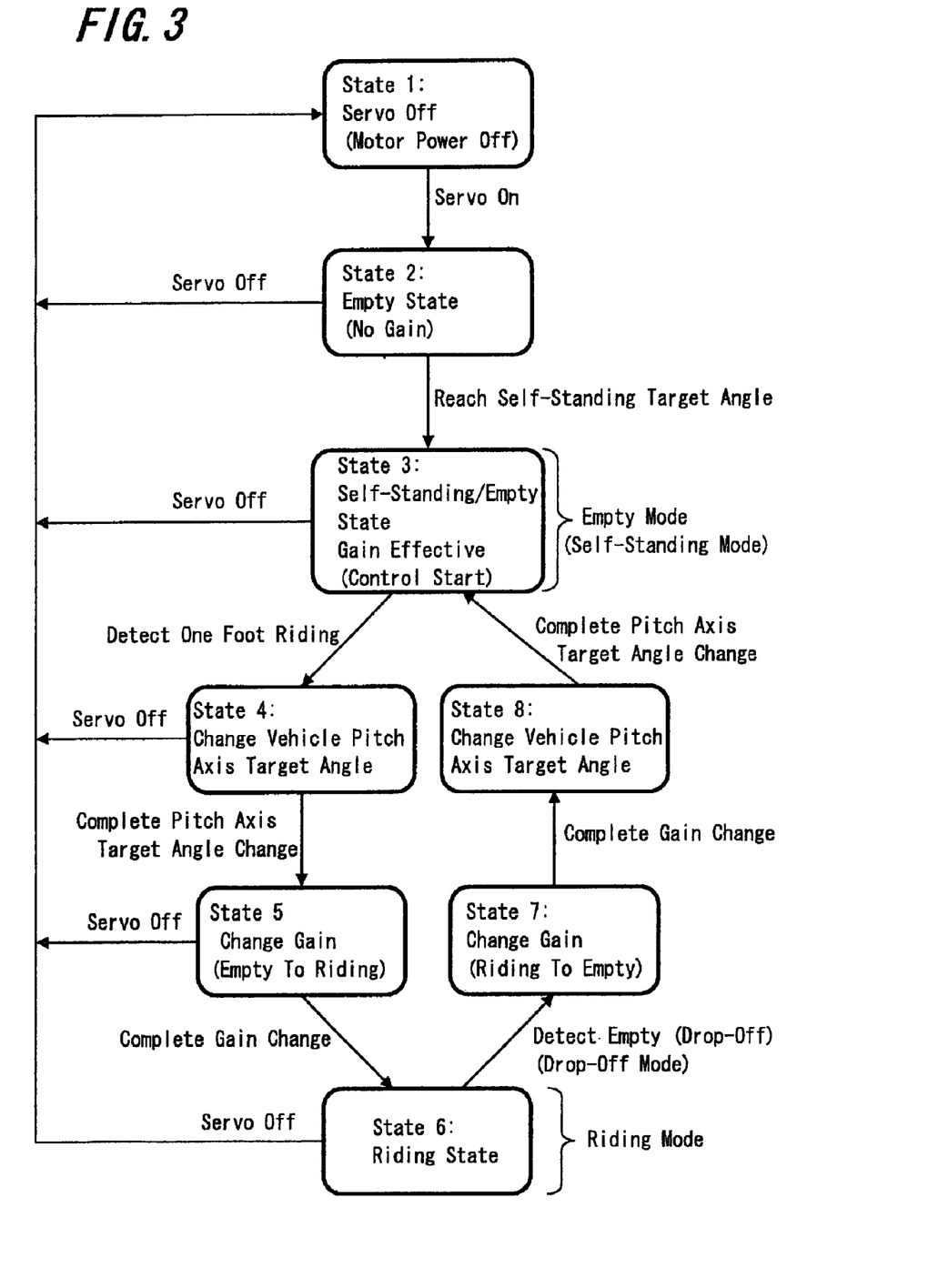
FIG. 3 is a state transition diagram for explaining the operation of the drive system of the parallel two-wheeled vehicle according to the embodiment of the present invention.

According to the embodiments of the present invention, those parameters and target values are arbitrarily controlled when such parallel two-wheeled vehicle switches to one mode from another mode, and so the vehicle is stabilized when a rider gets on board and the movement of the vehicle can be changed. FIG. 3 is a diagram showing the transition from a state of the vehicle, the control of which is stopped, to a state of a rider getting on board after the control is started.

State 1 in FIG. 3 shows a state of servo OFF. The control is not effective in the drive unit 15 or the power is not supplied in State 1, and the transition is made from State 1 to State 2 when a control start switch (servo switch) is pressed (ON).

State 2 shows the empty state (no gain). Power is supplied to the drive unit 15 in State 2, however all values of respective gains in [Formula 1] through [Formula 3] are set to zero. Accordingly, the control torque is not generated until a posture pitch axis angle reaches a predetermined angle, and so the vehicle does not suddenly start moving at the time of driving the vehicle. Further, the transition is made to State 3 when the posture pitch axis angle has reached the predetermined angle. Furthermore, the transition is made to State 1 when the servo switch is turned OFF.

Figure 4:
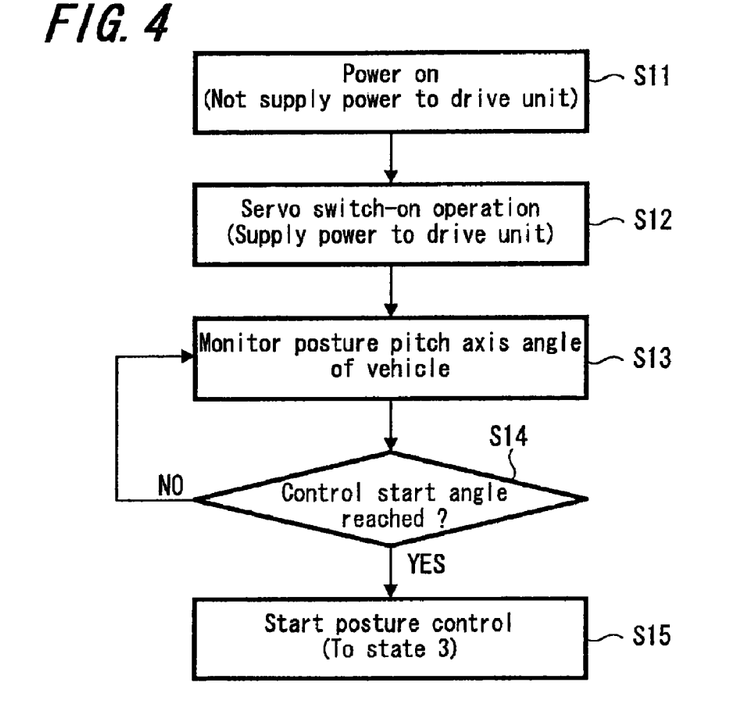
FIG. 4 is a flow chart for explaining the operation according to the embodiment of the present invention.

Here, processing in State 2 is further described in detail by referring to a flow chart shown in FIG. 4. Specifically, after power ON at step S11 (power is not supplied yet to the drive unit 15), power is started to be supplied to the drive unit 15 by an operation of servo switch ON at step S12 in FIG. 4. Then, the posture pitch axis angle of the vehicle is monitored at step S13. Further, it is judged at step S14 whether the posture pitch axis angle has reached a control start angle. In the case where the control start angle has not been reached (NO), the processing step is returned to step S13. On the other hand, in the case where the control start angle has been reached (YES) at step S14, the posture control is started at step S15 and the processing step is shifted to the next State 3.

Figure 5:
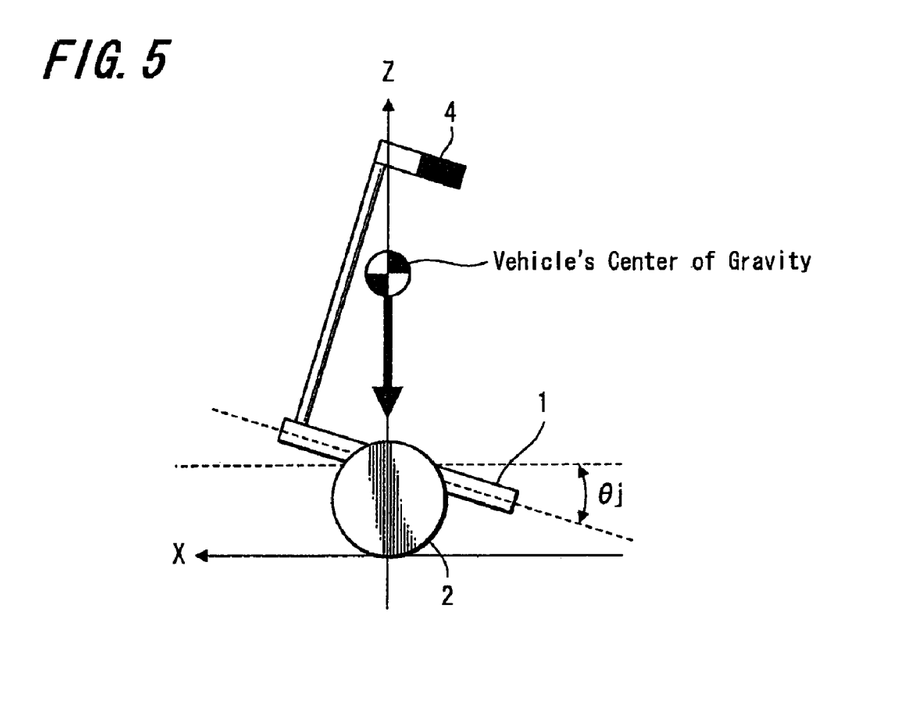
FIG. 5 is a diagram for explaining the operation.

Further, State 3 shows a self-standing/empty state (gain effective, and control start). In State 3, the posture control of the vehicle is started by setting the value of each gain in [Formula 1] through [Formula 3]. At this time, each of the gains and target values is determined according to the purpose of the vehicle. Specifically, in the case of the vehicle being stopped in a self-standing posture, for example, a value of the target pitch axis angle θref in [Formula 1] is set to a self-standing posture angle θj shown in FIG. 5 so that the vehicle can stand still while keeping self-standing posture as shown in FIG. 5. Here, the self-standing posture angle θj is the pitch axis angle in a state of the center of gravity of the vehicle is positioned right above the axle.

In addition, the target vehicle position Xref in [Formula 2] is set to a present X-coordinate position of the vehicle and the target vehicle velocity $\dot{X}$ref is set to zero so that the vehicle can stand still at the present X-coordinate position while keeping the self-standing state. It should be noted that each gain is adjusted to such a state that the vehicle is stably controllable. The State 3 is termed the empty mode or self-standing mode.

Figure 6:
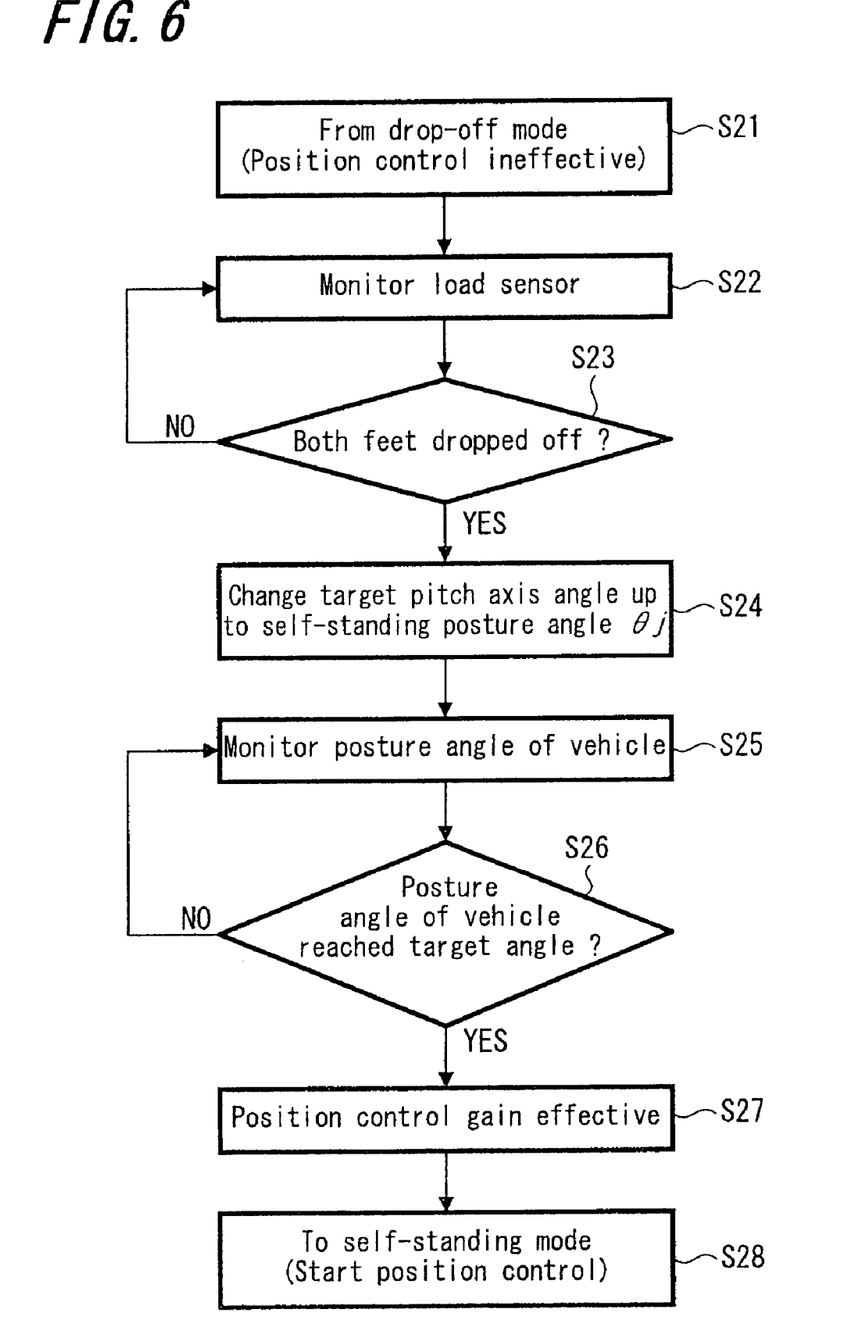
FIG. 6 is a flow chart for explaining the operation according to the embodiment of the present invention.

Processing of switching to State 3 is further described in detail by referring to a flow chart shown in FIG. 6. In other words, FIG. 6 shows the processing of switching from the riding mode to the self-standing mode. The mode is shifted from a drop-off mode, for example, at step S21 and the position control is not effective here. Then, the load sensor is monitored at step S22. Further, it is judged at step S23 whether both feet have dropped off the vehicle. In the case where the both feet have not dropped off (NO), the processing step is returned to step S22. On the other hand, in the case where the both feet have dropped off (YES) at step S23, the target pitch axis angle θ is changed to the self-standing posture angle θj at step S24.

In addition, the posture angle of the vehicle is monitored at step S25. Then, it is judged at step S26 whether the posture angle of the vehicle has reached the target angle. In the case where the posture angle has not reached the target angle (NO), the processing step is returned to step S25. On the other hand, in the case where the posture angle has reached the target angle (YES) at step S26, the control gain of the position control is set effective at step S27. Further, the position control is started and the mode is shifted to the self-standing mode at step S28.

Specifically, whether the rider's one foot is placed on the step is monitored in the self-standing/empty state of State 3 using the sensor or switch attached to the vehicle in order to identify the rider on board. Here, the above-described sensor or switch is such a device as a load sensor, proximity sensor or the contact switch, for example. Then, when it is detected by the above-described sensor and the like that one foot is placed on the step, the transition is made to the next State 4. In addition, the transition is made to State 1 when the servo switch is turned OFF.

State 4 is a state of changing the vehicle pitch axis target angle (from the empty state to riding state). In State 4, the posture pitch axis angle of the vehicle is gradually changed in the state where one foot is placed on the step. More specifically, preparation is made for shifting the vehicle from the empty mode to the riding mode by changing the value of θref in [Formula 1] according to the following [Formula 5], for example.

$$\theta ref(t) = (\theta ref\_drive - \theta j)/tres \times t + \theta j \quad \text{[Formula 5]}$$

Here, a value t represents elapsed time for shifting to the pitch axis target angle after the transition to State 4; θref_drive represents the posture pitch axis angle in the riding mode (zero degree in the case of keeping the riding posture level), and tres represents time until the shift to the riding posture is completed. Then, transition is made to State 5 after the time tres has elapsed (the angle has reached θref_drive). In addition, the processing step is returned to State 1 when the servo switch is turned OFF.

Figure 7:
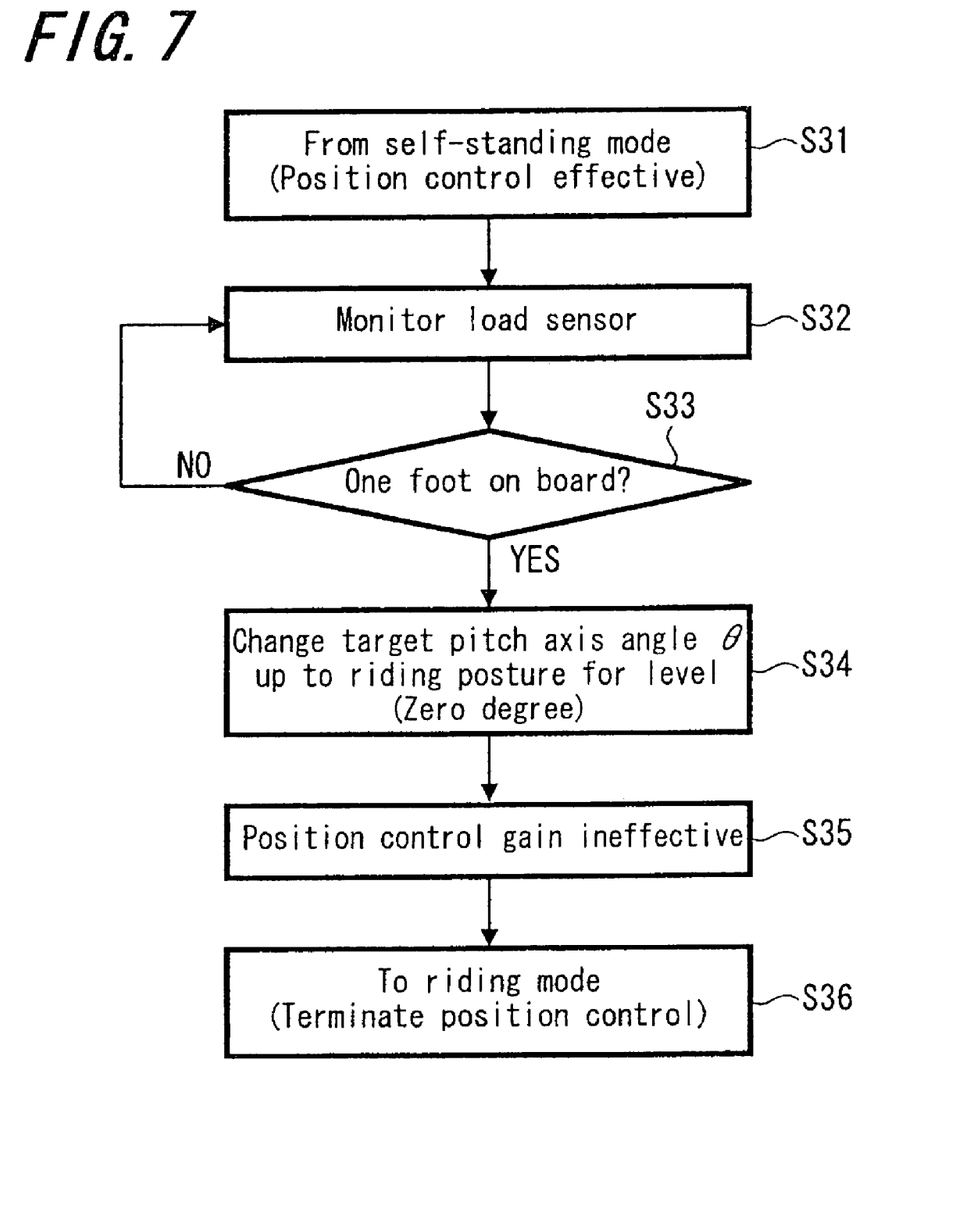
FIG. 7 is a flow chart for explaining the operation according to the embodiment of the present invention.

Processing in the state of changing the vehicle pitch axis target angle in State 4 is further described in detail by referring to a flow chart shown in FIG. 7. In FIG. 7, the shift is made from the self-standing mode, for example, at step S31 and the position control is effective here. Then, the load sensor is monitored at step S32. Further, it is judged at step S33 whether one foot has been put on board. In the case where one foot has not been put on board (NO), the processing step is returned to step S32.

On the other hand, in the case where one foot has been put on board (YES) at step S33, the target pitch axis angle θ is changed up to the riding posture that is level (zero degree) at step S34. In addition, the control gain of the position control is set ineffective at step S35. Then, the mode is shifted to the riding mode at step S36. It should be noted that the position control is stopped in the riding mode. Thus, the processing of changing the vehicle pitch axis target angle is performed in State 4.

State 5 shows a gain change (from the empty state to riding state). In State 5, each gain of the control shown in [Formula 1] through [Formula 3] is changed gradually in a state of the shift of the posture pitch axis angle having been completed. Each gain can be changed according to the following [Formula 6], for example.

$$K^{}(t)=(K^{}\_drive-K^{}\_empty)/tres \times t+K^{}\_empty \quad \text{[Formula 6]}$$

Here, t represents elapsed time for shifting the gain after the transition has been made to State 5, and $K^{}$ represents each gain shown in [Formula 1] through [Formula 3]. $K^{}\_drive$ is a final gain set in the riding state, $K^{}\_empty$ is a gain set in the empty state, and tres represents time until the shift of the gain is completed. Further, the transition is made to State 6 after the time tres has elapsed (the gain has been reached $K^{}\_drive$). In addition, the transition is made to State 1 when the servo switch is turned OFF.

More specifically, in the case where the vehicle is in the self-standing mode using [Formula 2] in State 3, normal traveling may not be possible even in the riding state if the position control of the self-standing mode is maintained, and therefore it is necessary to cancel the self-standing mode (cancel the position control using [Formula 2]) at the time of the gain shift. It should be noted that the processing of changing the gain (from the empty state to riding state) in State 5 is similar to the above-described flow chart shown in FIG. 7.

State 6 shows the riding state. Specifically, when the vehicle is in such state that the gain change is completed in State 4, the vehicle is ready for the rider to put both feet on the step. Here, the yaw axis control (turn control) shown in [Formula 3] is set ineffective in a state that the rider has not yet put the both feet on the step. This is to prevent an occurrence of such an unnecessary behavior that the vehicle happens to make a turn due to erroneous operation in the state of only one foot being put on the step, and the vehicle is set not to make the turn until the both feet are put on the step.

Then, it is detected that the rider's both feet are put on the step using the above-described sensor or switch to detect the rider on board, and the yaw axis control (turn control) shown in [Formula 3] is set effective when having completed the stable boarding on the vehicle. Accordingly, a series of normal traveling for the vehicle (posture control, straight traveling, turn traveling, and the like) can be performed. This is termed the riding mode.

Figure 8:
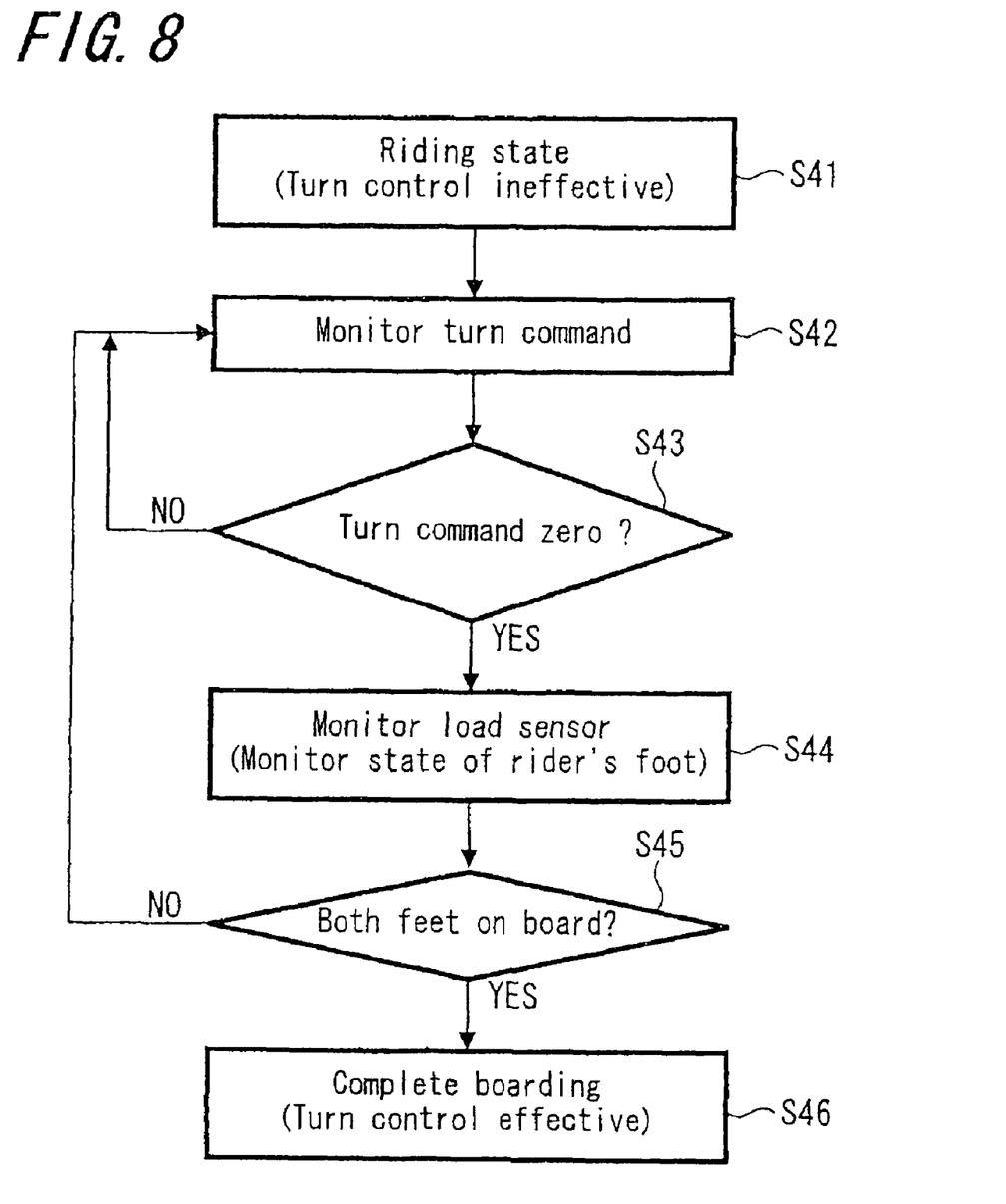
FIG. 8 is a flow chart for explaining the operation according to the embodiment of the present invention.

Here, processing in the riding state is further described in detail by referring to a flow chart shown in FIG. 8. In FIG. 8, the vehicle is in the riding state at step S41 and the turn control is set ineffective. Then, a turn command is monitored at step S42. Further, it is judged at step S43 whether the turn command is zero or not, more specifically whether the vehicle is operated erroneously. In the case where the turn command is not zero (NO), the processing step is returned to step S42.

On the other hand, in the case where the turn command is zero (YES) at step S43, the state of the load sensor is monitored further at step S44. More specifically, the state of the rider's foot is monitored here. Then, it is judged at step S45 whether the rider is in a state of putting two feet on board. In the case where the rider is not in the state of putting two feet on board (NO), the processing step is returned to step S42. Further, in the case where the rider is in the state of putting two feet on board (YES) at step S45, it is judged that the boarding is completed at step S46 and the turn control is set effective.

Furthermore, in the case of dropping off, such an unnecessary behavior that the vehicle happens to make a turn during the rider dropping off is also prevented from occurring. Specifically, the vehicle control is switched to a drop-off mode to stop the turn movement when the rider is dropping off so that the rider can stably drops off the vehicle. Then, the transition is made to State 7 after detecting the rider having dropped off the vehicle, and a preparation for switching to the empty mode is started. In addition, the transition is made to State 1 when the servo switch is turned OFF.

As a method for switching to the drop-off mode as described hereinbefore, a drop-off switch is provided to the vehicle, for example, so that the rider can switch to the drop-off mode by operating the switch. As another method in addition to the above, there is also a method of switching to the drop-off mode by detecting the rider's one foot being detached from the step for a certain period of time in a state where a vehicle velocity is sufficiently small.

Figure 9:
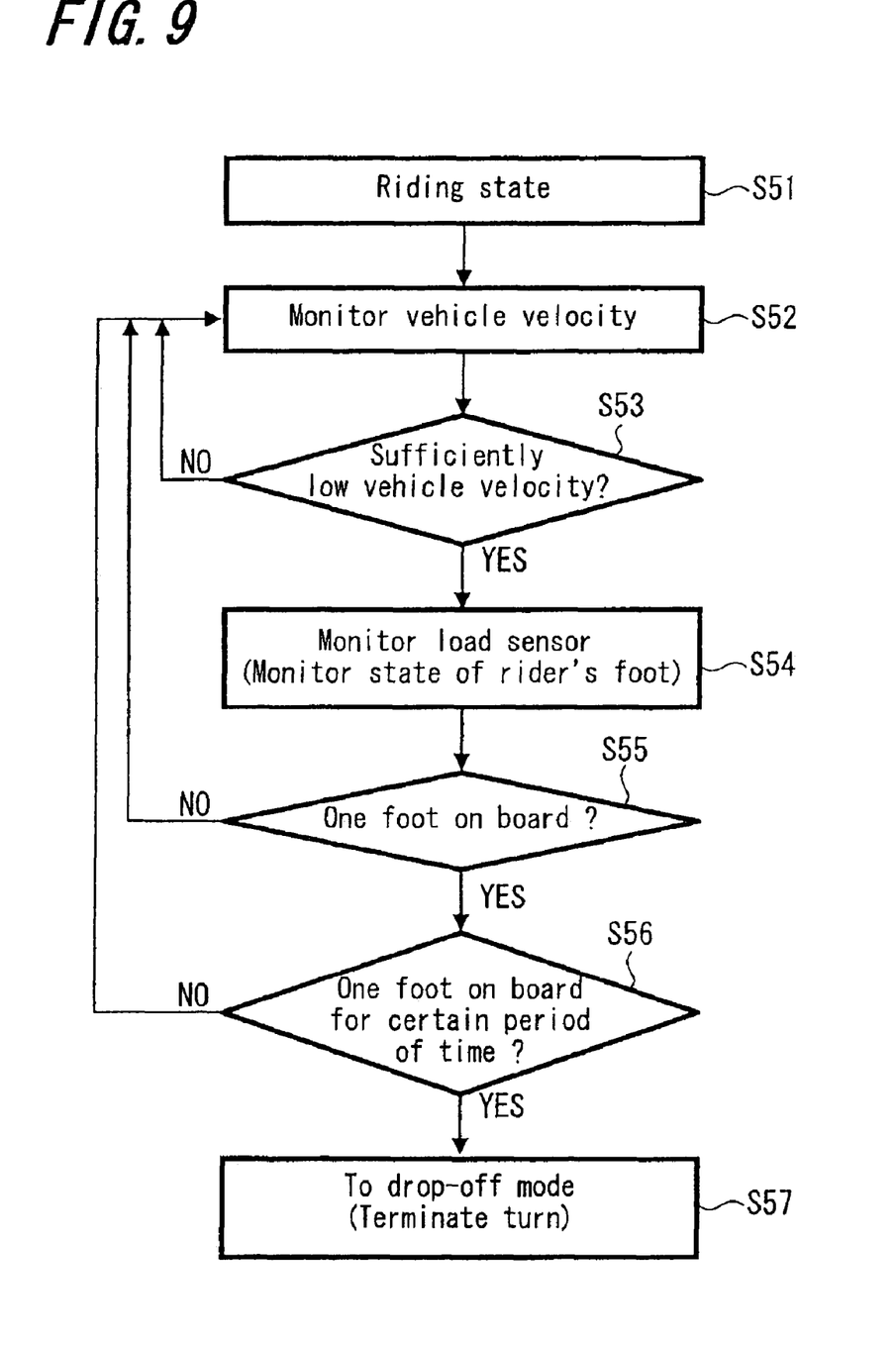
FIG. 9 is a flow chart for explaining the operation according to the embodiment of the present invention.

The method for switching to the drop-off mode is further explained in detail by referring to a flow chart shown in FIG. 9. In FIG. 9, step S51 is the riding state. The vehicle velocity is monitored in this state at step S52. Further, it is judged at step S53 whether the vehicle velocity is sufficiently small. In the case where the vehicle velocity is not sufficiently small (NO), the processing step is returned to step S52.

On the other hand, in the case where the vehicle velocity is sufficiently small (YES) at step S53, the state of the load sensor is monitored further at step S54. Specifically, the state of the rider's foot is monitored here. Then, it is judged at step S55 whether the rider is in a state of putting one foot on board. In the case where the rider is not in the state of putting one foot on board (NO), the processing step is returned to step S52. In addition, it is further judged at step S56 whether the state of putting one foot on board has been continuing for a certain period of time in the case where the rider is in the state of putting one foot on board (YES) at step S55. In the case where the state of putting one foot on board has not been continuing, the process is returned to step S52.

Then, in the case where the state of putting one foot on board has been continuing for the certain period of time (YES) at step S56, the mode is shifted to the drop-off mode at step S57 and the turn movement is stopped. As described hereinbefore, the vehicle control is switched to the drop-off mode to stop the turn movement when the rider drops off the vehicle, thereby preventing such unnecessary behavior that the vehicle happens to make the turn during the rider dropping off from occurring so that the rider can stably drop off the vehicle.

In addition, State 7 shows the gain change (from the riding state to empty state). Specifically, a preparation for shifting to the empty mode is made in State 6 after detecting the rider having dropped off the vehicle in the drop-off mode. A reverse operation to the gain operation performed in State 5 is performed here. For example, the gain control can be performed based on the following formula.

$$K^{}(t)=(K^{}\_{empty}-K^{}\_{drive})/tres \times t+K^{}\_{drive} \quad \text{[Formula 7]}$$

Here, t represents elapsed time for shifting the gain after the transition has been made to State 7, and $K^{}$ represents respective gains shown in [Formula 1] through [Formula 3]. $K^{}\_{drive}$ represents the final gain set in the riding state, $K^{}\_{empty}$ represents the gain set in the empty state, and tres represents time until the shift of the gain is completed. Then, the transition is made to State 8 after tres time has elapsed (the gain has reached $K^{}\_{empty}$). In addition, the transition is made to State 1 when the servo switch is turned OFF.

Further, State 8 shows a state of changing the vehicle pitch axis target angle (from the riding state to empty state). In State 8, a reverse operation to the operation of changing the vehicle pitch axis target angle performed in State 4 is here performed after completing the change of the gain. The target angle is changed based on the following formula, for example.

$$\theta ref(t)=(\theta j-\theta ref\_{drive})/tres \times t+\theta ref\_{drive} \quad \text{[Formula 8]}$$

Here, t represents elapsed time for shifting to the pitch axis target angle after the transition has been made to State 8, $\theta ref\_{drive}$ represents the posture pitch axis angle in the riding mode (zero degree in the case of keeping the riding posture level), and tres represents time until the shift to the riding posture is completed. After tres time has elapsed (the angle has reached $\theta j$), the transition is made to State 3. In addition, the transition is made to State 1 when the servo switch is turned OFF. It should be noted that details of the processing are similar to those of the flow chart shown in FIG. 6.

As described hereinbefore, the states of the vehicle such as "empty mode" and "riding mode" as well as "self-standing mode" and "drop-off mode" as additional states can be managed and controlled in respective modes by following the state transition. As a result, getting on and dropping off the vehicle can be performed more stably in the parallel two-wheeled vehicle.

Here, if the posture of the parallel two-wheeled vehicle starts to be controlled without considering the management of each mode according to the state of the vehicle as proposed in this embodiment, it is difficult for the vehicle to stand still at the same place in the empty state of no rider on board and there is such possibility that the control becomes very unstable to cause unnecessary behavior to the vehicle.

According to embodiments of the present invention, states of the vehicle are separately managed such as the empty mode and riding mode, and the control parameters for the vehicle and the vehicle posture are continuously shifted when shifting from one mode to another mode as described above, thereby maintaining the stability when getting on board so that the rider can easily get on and drop off the vehicle. In addition, the turn movement of the vehicle caused by an erroneous operation can be prevented by stopping the turn control during getting on board and in the drop-off mode.

Further, the position control is applied to the vehicle in the empty mode so that the vehicle position can be maintained by stopping the vehicle at the same place as the self-standing mode.

As heretofore described, according to the embodiments of the traveling apparatus and the method of controlling the parallel two-wheeled vehicle, the parallel two-wheeled vehicle includes the driver to independently drive two wheels disposed in parallel, the chassis to connect the two wheels, the detector provided in the chassis to detect the posture angle of the chassis, and travels with rotating speed of the two wheels being set respectively based on the information on the detected posture angle. The parallel two-wheeled vehicle is configured such that the activation of a function can be arbitrarily controlled when the vehicle is in the empty state and in the state of transition between the empty state and the riding state, thereby preventing the unnecessary behavior of the vehicle and particularly the rider getting on and dropping off the vehicle easily.

Accordingly, in apparatuses of the related art, the vehicle may receive discontinuous control commands from a sensor and the like particularly during the transition between the empty mode and the riding mode; the movement may become unstable and may cause unnecessary behavior to the vehicle; and therefore it is difficult for a user in general to use the vehicle. However, according to the embodiments of the present invention the apparatus without such problems can be obtained.

It should be noted that the present invention is not limited to the embodiments explained hereinbefore and various alterations are possible without deviating from the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A traveling apparatus comprising:
   drive means for independently driving two wheels disposed in parallel;
   a chassis that connects the two wheels;
   detection means provided in the chassis for detecting a posture angle of the chassis, such that rotating speed of the two wheels is set respectively based on information on the detected posture angle; and
   empty vehicle control means for controlling a posture of a vehicle to stand the vehicle independently in a state of no rider on board,
   wherein when the traveling apparatus is in an empty state and the posture angle detected by the detection means is less than a predetermined posture angle, then a gain of the drive means is zero, and
   wherein the empty vehicle control means limits or controls the posture angle once the posture angle detected by the detection means is equal to or greater than the predetermined posture angle.

2. A traveling apparatus according to claim 1, wherein the empty vehicle control means controls a position of the vehicle to be maintained regardless of the information on the detected posture angle.

3. A traveling apparatus comprising:
   drive means for independently driving two wheels disposed in parallel;
   a chassis for connecting the two wheels;
   a turn operation unit configured to input a turn command via a control lever;

detection means provided in the chassis for detecting a posture angle of the chassis, such that rotating speed of the two wheels being set respectively based on information on the detected posture angle;

empty vehicle control means for controlling a posture of a vehicle to stand the vehicle independently in a state of no rider on board;

riding control means for controlling the posture of the vehicle to stand the vehicle independently in a state of the rider on board; and riding detection means provided to the riding control means for detecting a state of the rider having completed boarding, wherein a function of turning the vehicle is stopped in a transition from the control by the empty vehicle control means to the control by the riding control means until the turn command is zero and the riding detection means detects the rider having completed the boarding.

4. A traveling apparatus according to claim 3, wherein the empty vehicle control means controls a position of the vehicle to be maintained regardless of the information on the detected posture angle, and the riding control means cancels the control to maintain the position of the vehicle after the transition.

5. A traveling apparatus comprising:

drive means for independently driving two wheels disposed in parallel;

a chassis for connecting the two wheels;

a turn operation unit configured to input a turn command via a control lever;

detection means provided in the chassis for detecting a posture angle of the chassis, such that rotating speed of the two wheels being set respectively based on information on the detected posture angle;

empty vehicle control means for controlling a posture of a vehicle to stand the vehicle independently in a state of no rider on board;

riding control means for controlling the posture of the vehicle to stand the vehicle independently in a state of the rider on board; and riding detection means provided to the riding control means for detecting a state of the rider having completed boarding, wherein a function of turning the vehicle is stopped in a transition from the control by the riding control means to the control by the empty vehicle control means until the turn command is zero and the riding detection means detects that the rider has placed both feet upon a predetermined area located on the chassis.

6. A traveling apparatus according to claim 5, wherein the empty vehicle control means controls a position of the vehicle to be maintained regardless of the information on the detected posture angle after the transition to the control by the empty vehicle controller.

7. A traveling apparatus comprising:

a driver configured to independently drive two wheels disposed in parallel;

a chassis configured to connect the two wheels;

a detector provided in the chassis configured to detect a posture angle of the chassis, such that rotating speed of the two wheels being set respectively based on information on the detected posture angle; and an empty vehicle controller configured to control a posture of a vehicle to stand the vehicle independently in a state of no rider on board, wherein when the traveling apparatus is in an empty state and the posture angle detected by the detector is less than a predetermined posture angle, then a gain of the driver is zero, and wherein the empty vehicle controller limits or controls the posture angle once the posture angle detected by the detector is equal to or greater than the predetermined posture angle.

8. A traveling apparatus comprising:

a driver configured to independently drive two wheels disposed in parallel, a chassis configured to connect the two wheels;

a detector provided in the chassis configured to detect a posture angle of the chassis, such that rotating speed of the two wheels being set respectively based on information on the detected posture angle;

a turn operation unit configured to input a turn command via a control lever;

an empty vehicle controller configured to control a posture of a vehicle to stand the vehicle independently in a state of no rider on board;

a riding controller configured to control the posture of the vehicle to stand the vehicle independently in a state of the rider on board; and a riding detector provided to the riding controller configured to detect a state of the rider having completed the boarding, wherein a function of turning the vehicle is stopped in a transition from the control by the empty vehicle controller to the control by the riding controller until the turn command is zero and the riding detector detects the rider having completed the boarding.

9. A traveling apparatus comprising:

a driver configured to independently drive two wheels disposed in parallel;

a chassis configured to connect the two wheels;

a turn operation unit configured to input a turn command via a control lever;

a detector provided in the chassis configured to detect a posture angle of the chassis, such that rotating speed of the two wheels being set respectively based on information on the detected posture angle;

an empty vehicle controller configured to control a posture of a vehicle to stand the vehicle independently in a state of no rider on board;

a riding controller configured to control the posture of the vehicle to stand the vehicle independently in a state of the rider on board; and a riding detector provided to the riding controller configured to detect a state of the rider having completed the boarding, wherein a function of turning the vehicle is stopped in a transition from the control by the riding controller to the control by the empty vehicle controller until the turn command is zero and the riding detector detects that the rider has placed both feet upon a predetermined area located on the chassis.

10. A traveling apparatus according to claim 1, wherein the empty vehicle control means limits or controls the posture angle such that a center of axis of the traveling apparatus is positioned above a center axis of the two wheels.

11. A traveling apparatus according to claim 3, wherein the empty vehicle control means limits or controls the posture angle such that a center of axis of the traveling apparatus is positioned above a center axis of the two wheels.

12. A traveling apparatus according to claim 5, wherein the empty vehicle control means limits or controls the posture angle such that a center of axis of the traveling apparatus is positioned above a center axis of the two wheels.

* * * * *